(12) United States Patent
Verma et al.

(10) Patent No.: US 11,763,350 B2
(45) Date of Patent: Sep. 19, 2023

(54) SYSTEMS AND METHODS FOR GENERATING A PERSONALIZED ADVERTISEMENT

(71) Applicant: COUPANG CORP., Seoul (KR)

(72) Inventors: Vinay Verma, Fremont, CA (US); Jing Li, Shanghai (CN); Xinli Bao, Palo Alto, CA (US); Hyun Jung Cho, Seoul (KR); Satyavaraprasad Vadlamudi, Santa Clara, CA (US); Michael Rowan Savio, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/516,487

(22) Filed: Nov. 1, 2021

(65) Prior Publication Data

US 2023/0139513 A1     May 4, 2023

(51) Int. Cl.
*G06Q 30/02*       (2023.01)
*G06Q 30/0251*     (2023.01)
(Continued)

(52) U.S. Cl.
CPC ... *G06Q 30/0271* (2013.01); *G06F 16/24578* (2019.01); *G06N 20/00* (2019.01); *G06Q 30/0256* (2013.01); *G06Q 30/0631* (2013.01)

(58) Field of Classification Search
CPC .......... G06Q 30/0271; G06Q 30/0256; G06Q 30/0631
See application file for complete search history.

(56) References Cited

U.S. PATENT DOCUMENTS 6,266,649 B1 *   7/2001   Linden ................... G06Q 30/02
                                                      705/26.7
10,162,868 B1 * 12/2018   Zappella ........... G06F 16/24578
(Continued)

FOREIGN PATENT DOCUMENTS

| KR | 10-2018-0062629 A | 6/2018 |
| KR | 10-2091529 B1 | 3/2020 |
| KR | 10-2213768 B1 | 2/2021 |

OTHER PUBLICATIONS

"2 Different Abandoned Cart Strategies Courtesy of eBay and Amazon" (published on Apr. 18, 2018 https://www.sailthru.com/marketing-blog/abandoned-cart-strategies-ebay-amazon/) (Year: 2018).*
(Continued)

*Primary Examiner* — James M Detweiler
(74) *Attorney, Agent, or Firm* — FINNEGAN, HENDERSON, FARABOW, GARRETT & DUNNER, LLP

(57) ABSTRACT

Systems and methods of generating, for display on a graphical user interface (GUI), a personalized advertisement. The systems and methods can include receiving data indicative of initiating a browsing session, aggregating user activity data associated with a user of the application, the user activity data including current session data and/or past session data, applying machine learning on the user activity data to generate one or more excluded products, applying the one or more excluded products to a product database to generate a list of relevant products, ranking, using one or more ranking rules, the list of relevant products to generate a ranked list of relevant products, and sending, to the mobile device, the personalized advertisement including one or more relevant products from the ranked list of relevant products.

14 Claims, 9 Drawing Sheets

(51) Int. Cl.
*G06Q 30/0601* (2023.01)
*G06F 16/2457* (2019.01)
*G06N 20/00* (2019.01)

(56) References Cited

U.S. PATENT DOCUMENTS

| | | | |
|---|---|---|---|
| 11,004,135 B1* | 5/2021 | Sandler | G06Q 30/0631 |
| 2011/0066497 A1 | 3/2011 | Gopinath et al. | |
| 2018/0068232 A1* | 3/2018 | Hari Haran | G06F 3/0482 |
| 2018/0158129 A1* | 6/2018 | Kohli | G06Q 30/0633 |
| 2020/0311159 A1* | 10/2020 | Ahlstrom | G06F 16/285 |
| 2021/0090111 A1* | 3/2021 | Garg | G06Q 30/0631 |
| 2021/0118036 A1 | 4/2021 | Jiang et al. | |
| 2022/0277345 A1* | 9/2022 | Nag | G06N 5/04 |

OTHER PUBLICATIONS

International Search Report and Written Opinion in corresponding PCT Application No. PCT/IB2021/062353; dated Jul. 29, 2022 (10 pages).

* cited by examiner

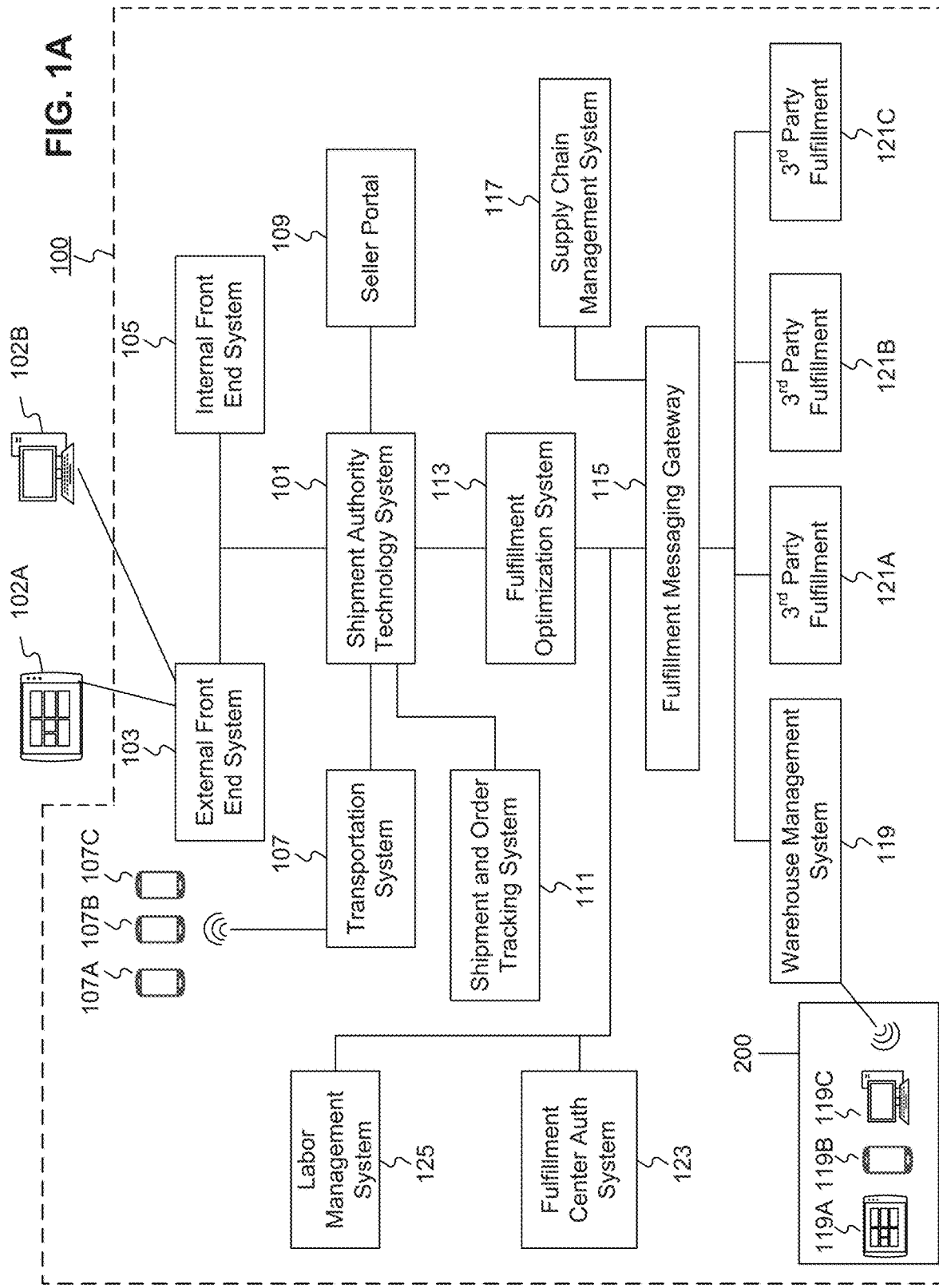

SYSTEMS AND METHODS FOR GENERATING A PERSONALIZED ADVERTISEMENT

TECHNICAL FIELD

The present disclosure generally relates to computerized systems and methods for generating and displaying advertisements. In particular, embodiments of the present disclosure relate to inventive and unconventional systems and methods for generating and transmitting personalized advertisements to a user device.

BACKGROUND

Online advertisements predominantly appear as either banners near content desired by the user or as banners that "pop-up" in a new window when the user accesses desired content. Advertisers often tailor the content of these advertisements to appeal to a target audience, thereby increasing the likelihood of a sale and/or site traffic. In e-commerce, advertisers often utilize products that a user has previously purchased to tailor the content of the advertisement to the user. Frequently, however, users add products they are interested into their cart with the intent to purchase, but, for various reasons, forget to complete the transaction (e.g., purchase the products in their cart), resulting in the products becoming "abandoned".

Consequently, systems that tailor advertisement content using a user's purchase history do not account for abandoned products (or products similar to the abandoned products) when determining content to be displayed to a user in an advertisement. As a result, the user is shown less relevant advertisement content, leading to lower sales and/or site traffic.

These and other disadvantages exist.

Therefore, there is a need for improved methods and systems for generating personalized advertisements at least based on cart history.

SUMMARY

One aspect of the present disclosure is directed to a method for generating, for display on a graphical user interface (GUI) of an application, a personalized advertisement including: receiving, from an application, at least one of: current client information, or current session data; retrieving, from a user activity database, current user activity data including at least one of: current product status data, current financial data, current product data, and/or current user activity data; applying machine learning on the current user activity data to generate one or more excluded products, applying the one or more excluded products to a product database to generate a list of relevant products, ranking, using one or more ranking rules, the list of relevant products to generate a ranked list of relevant products, and sending, to the application for display, a personalized advertisement including one or more relevant products from the ranked list of relevant products.

Another aspect of the present disclosure is directed to a system for generating, for display on a graphical user interface (GUI) of an application, a personalized advertisement including: one or more processors, and computer readable memory media including instructions to cause one or more processor to: receive, from an application, at least one of: current client information, or current session data; aggregate user activity data associated with a user of the application, current user activity data including at least one of: current product status data, current financial data, current product data, and/or current user activity data; apply machine learning on the user activity data to generate one or more excluded products; apply the one or more excluded products to a product database to generate a list of relevant products; rank, using one or more ranking rules, the list of relevant products to generate a ranked list of relevant products; and send, to the application for display on the GUI, the personalized advertisement comprising one or more relevant products from the ranked list of relevant products.

Yet another aspect of the present disclosure is directed to a method for generating, for display on a graphical user interface (GUI) of an application, a personalized advertisement including: receiving, from an application, at least one of: current client information, or current session data; retrieving, from a user activity database, current user activity data comprising at least one of: current product status data, current financial data, current product data, and/or current user activity data; applying machine learning on the user activity data to generate one or more excluded products, the generation of the one or more excluded products including: determining a product category of a purchased product; determining a match between the product category of the purchased product and a product category of one or more products in a product database; generating a list of similar products based on the match and the one or more products in the product database; aggregating a list of purchased products and transaction data for a plurality of users; applying machine learning on the transaction data to determine a repurchase frequency for each purchased product in the list of purchased products; determining that the repurchase frequency for a set of one or more products is less than a repurchase frequency threshold; and generating a list of short-cycle products based on the set of one or more products; applying the one or more excluded products to the product database to generate a list of relevant products; ranking, using one or more ranking rules, the list of relevant products to generate a ranked list of relevant products; and sending, to the application for display on the GUI, a personalized advertisement including one or more relevant products from the ranked list of relevant products.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for generating and transmitting a personalized advertisement to a user device.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1C:
FIG. 1C depicts a sample Single Detail Page (SDP) that includes a product and information about the product along with interactive user interface elements, consistent with the disclosed embodiments.
Figure 1D:
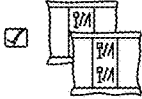
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device, in that the user owns the mobile device (e.g., the mobile device is a smartphone). In other situations, a user may be associated with a mobile device, in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second login process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
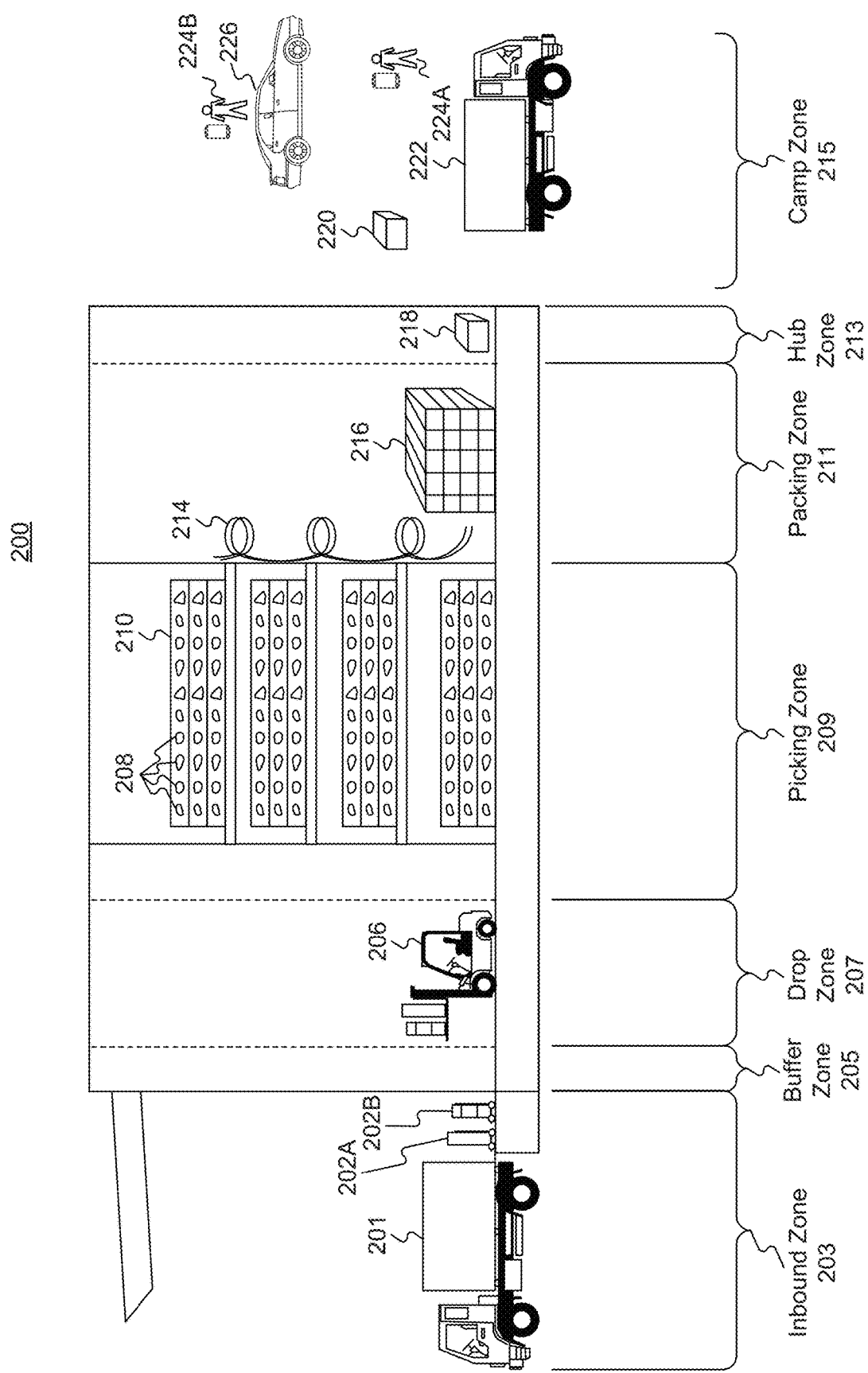
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
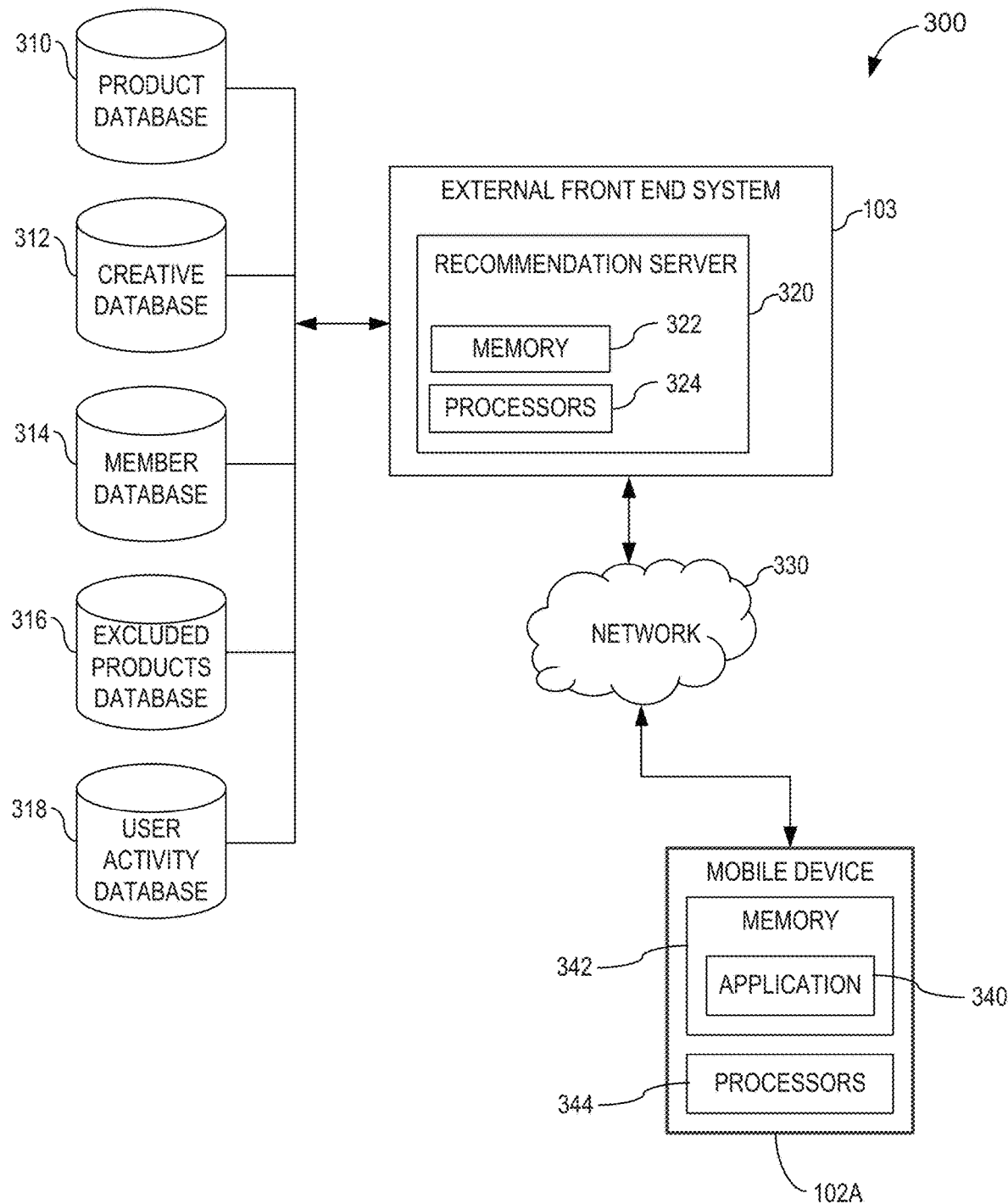
FIG. 3 is a schematic block diagram illustrating an exemplary embodiment of a network comprising computerized systems for generating and transmitting personalized advertisements to a user device, consistent with the disclosed embodiments.

FIG. 3 depicts an example system 300 for generating personalized advertisements. The system 300 can include one or more databases, for example, a product database 310, a creative database 312, a member database 314, an excluded product database 316, and/or a user activity database 318. The product database 310, the creative database 312, the member database 314, the excluded product database 316, and/or the user activity database 318 can be in communication with a recommendation module 320. Additionally or alternatively, the product database 310, the creative database 312, the member database 314, the excluded product database 316, and/or the user activity database 318 can be in communication with at least one of: the external front end system 103, the seller portal 109, shipment authority technology system 101, supply chain management system 117, or the internal front end system 105. Additionally or alternatively, the product database 310, the creative database 312, the member database 314, the excluded product database 316, and/or the user activity database 318 can be in communication with the external front end system 103. The external front end system 103 can include a recommendation module 320. Alternatively, the recommendation module 320 can be independent of, but in communication with, the external front end system 103. The external front end system 103 and/or recommendation module 320 can be in communication with the mobile device 102A over a network 330. The mobile device 102A, the external front end system 103, the recommendation module 320, and the network 330 can each be configured to send and receive data between one another over the network 330. Alternatively, the recommendation module 320 can be in communication with the external front end system 103 over the network 330. The network 330 can be a wireless network, a wired network, or any combinations thereof. Though only one user device (e.g., mobile device 102A) is shown for simplicity, it will be understood by one of skill in the art that multiple mobile devices and/or computers can be in communication with the recommendation module 320 and/or the external front end system 103 over the network 330.

The mobile device 102A, can include an application 340 stored on non-transitory memory 342 and in communication with one or more processors 344. The application 340 can include a graphical user interface (GUI) configured to display data, for example, media, web elements or advertisements from the external front end system 103 and/or recommendation module 320.

The product database 310 can be a memory storage for storing data associated with one or more products. The product database 310 can include, for example, at least one of: stock keeping units (SKUs), barcodes, unique identifiers, product descriptions, product name, product pricing, product rating, product shipping information, product exchange information, product return information, product category, product location, and product availability.

The creative database 312 can be a memory storage for storing media associated with one or more of the products in the product database 310. The creative database 312 can include, for example, images, videos, GIFs, cartoons, audio files, and/or CAD models of the products. Additionally, the creative database 312 can store badges associated with a level of service associated with the product. In an example, if a product can be shipped on the same day that an order for the product is placed, the recommendation module 320 can retrieve a badge associated with same-day shipping level of service from the creative database 312.

The member database 314 can be a memory storage for storing account information relating to users. For example, account information can be stored for users who have registered with system 100. The member database 314 can include name, address, membership status, order history, member ID, payment information, and/or login credentials (e.g., username and/or password).

The excluded product database 316 can include one or more excluded products. The excluded products can be one or more of: a list of blacklisted products, a list of similar products, a list of purchased products, or a list of short-cycle products. Additionally, the one or more excluded products can be based on products that are in the user's cart or products that are part of an active pending transaction. Additionally or alternatively, the one or more excluded products can be based on products that are in the user's cart for less than a period of time. For example, products added to the user's cart within the last 24 hours.

Blacklisted products can include products that the user finds undesirable to be seen by others. Blacklisted products can include one or more of: intimate or erotic apparel, personal hygiene products, alcoholic products, erotic or sexual paraphernalia, or sexual wellbeing products. The recommendation module 320 can generate a list of blacklisted products by adding to the list, products associated with specific product categories. The recommendation module 320 can receive user feedback, for example, the user can be prompted provide feedback concerning the display of a certain product, causing the recommendation module 320 to update the list of backlisted products. If the user provides feedback indicating that they do not wish to see the certain product, the recommendation module 320 can add the certain product and/or products associated with the certain product's product category to the list of blacklisted products.

A list of similar products can include products within the same category of a searched or browsed product; for example, sandals and sneakers are a part of the "footwear" category, and if the user searches for "sandals," the recommendation module 320 can determine sneaker products to be similar products and the recommendation module 320 can add the sneaker products to the list of similar products based on a matching product category. Alternatively, the list of similar products can be temporally similar, for example, products and/or categories searched or browsed in a single session. For example, if the user, in preparation for Valentine's Day, browses for a gourd, an adhesive mustache, and a stuffed unicorn in a single session, the recommendation module 320 can add products in the product categories associated with the browsed (or searched) products (e.g., "food" category for the gourd, "party supplies" category for the mustache, and "toys" category for the stuffed unicorn) to the list of similar products. Additionally or alternatively, the list of similar items can be determined based on multiple user sessions over a period of time. For example, recommendation module 320 can use all products searched or browsed by the user over several sessions over a time period of 24 hours to determine similar products. The recommendation module 320 can then add the similar products to the list of similar products.

The recommendation module 320 can determine a list of short-cycle products. Short-cycle products can include products that have a repurchase frequency below a repurchase frequency threshold. The repurchase frequency can be a time period, for example, 1 day, 5 days, 7 days, 10 days, 14 days, 15 days, 30 days, 45 days, and/or 60 days between the user's purchase of a product and a subsequent purchase of the same product. In an example, the time period can start from the date of purchase of the product. In another example, the time period can start upon being delivered to the user. If the user, for example, repurchases laundry detergent 30 days after an initial purchase of laundry detergent, the recommendation module 320 can determine the repurchase frequency to be 30 days. In another example, if the user makes repurchases at different time periods, for example a first repurchase at 15 days and a next repurchase of 45 days after the first repurchase, the recommendation module 320 can determine the repurchase frequency to be the mean of the time periods (e.g., 30 days). It will be understood that other statistical descriptors, such as median or mode can also be used to determine the repurchase frequency. Alternatively, the recommendation module 320 can determine the repurchase frequency to be only that of the last time period (e.g., 45 days). The repurchase frequency of a product can be based on the user's repurchase history of that product. Additionally or alternatively, the recommendation module 320 can determine the repurchase frequency of a product based on the time period between a purchase and a repurchase for a plurality of users. The recommendation module 320 can aggregate a plurality of repurchase frequencies associated with a product for a plurality of users to generate a repurchase frequency distribution. The recommendation module 320 can perform a statistical analysis on the repurchase frequency distribution, and determine the repurchase frequency for a product to be one of: a mean, a median, a mode, an upper quartile range, or a lower quartile range of the distribution. Additionally or alternatively, the recommendation module 320 can determine the repurchase frequency for products in real-time and adjusted automatically for one or more products, or the recommendation module 320 can apply a predetermined static value for the one or more products. It will be understood that the recommendation module 320 can determine the repurchase frequency independent of a brand; for example, if the user purchases a Tide™ branded laundry detergent, and on the 30$^{th}$ day purchases a Gain™ branded laundry detergent, the recommendation module 320 can still determine that laundry detergent was purchased on the 30$^{th}$ day and determine the repurchase frequency to be 30 days. It will also be understood that different products can have different repurchase frequencies. Additionally, the recommendation module 320 can distinguish between short-cycle products and a return/exchanged product. For example, if the user purchases a product, and repurchases the product within a time period after receiving delivery, the recommendation module 320 can determine that the product is not a short-cycle product. Additionally or alternatively, if the user purchases a first one of a product, and purchases a second one of a product within a time period after receiving delivery, and then initiates a product return or product exchange procedure for the first one of the product within a time period before or after the purchase of the second one, the recommendation module 320 can determine that the product is not a short-cycle product. The time period can be predetermined based on a product's or a manufacture's return policy. Additionally or alternatively, the time period can be 5 minutes, 30 minutes, 1 hour, 3 hours, 6 hours, 12 hours, 24 hours, 2 days, 5 days, 7 days, and/or 14 days. As discussed above, the time period can start upon delivery of the first one of the product to the customer, upon the completing the transaction to purchase the first one of the products, and/or upon initiating the return or exchange procedures.

A repurchase frequency threshold can be a value representative of a time period, for example, 1 day, 5 days, 7 days, 10 days, 14 days, 15 days, 30 days, 45 days, and/or 60 days between the user's purchase of a product and a subsequent purchase of the same product. For example, if a product has a repurchase frequency of 15 days, and the repurchase frequency threshold is 30 days, the recommendation module 320 can determine the product to be a short-cycle product and added to the list of short-cycle products. Additionally or alternatively, the recommendation module 320 can add products within a product category associated with the short-cycle product to the list of short-cycle products. Additionally or alternatively, the recommendation module 320 can determine the repurchase frequency threshold in real-time and adjusted automatically, or can be a predetermined static value. The recommendation module 320 can aggregate a plurality of repurchase frequency thresholds associated with a product for a plurality of users to generate a repurchase frequency threshold distribution. Additionally, the recommendation module 320 can perform a statistical analysis on the repurchase frequency threshold distribution, and determine the repurchase frequency for a product to be one of: a mean, a median, a mode, an upper quartile range, or a lower quartile range of the distribution. It will also be understood that different products can have different repurchase frequency thresholds. As discussed above, it will be understood that recommendation module 320 can exclude repurchase frequencies associated with return or exchange products when determining the repurchase frequency threshold.

The list of purchased products can include products that were purchased by the user in the past. Additionally, the list of purchased products can include products associated with product categories that are associated with products purchased by the user in the past. The recommendation module 320 can determine a purchased product based on the user's transaction history or purchase history. Additionally, the recommendation module 320 can determine that a product that was purchased by the user, but then subsequently returned, to be a purchased product. Additionally or alternatively, the recommendation module 320 can determine a product that was purchased by the user, then returned by the user, and then repurchased by the user, to be a purchased item.

Additionally, the recommendation module 320 can use one or more of: the list of blacklisted products, the list of similar products, the list of purchased products, the list of short-cycle products, products in pending transaction, and products added to the cart, to exclude products and/or product categories to determine the list of relevant products.

The user activity database 318 can include current user activity data. Alternatively, the mobile device 102A can send current user activity data to the recommendation module 320 and/or external front end system 103. The current user activity data can include client information, for example, one or more of: Session ID, User ID, hardware information, software information, and location data. Additionally or alternatively, the current user activity data can include financial data, for example, one or more of: product offers, transaction data, and pending transaction data. Additionally or alternatively, current user activity data can include session data, for example, one or more of: session search history, session duration, session start timestamp, and session browsing history. Additionally or alternatively, the current user activity data can include product status data, for example, one or more of: "in-cart" products, not "in-cart" products, removed products, returned products, exchanged products, purchased products, and abandoned products.

Additionally or alternatively, the user activity database 318 can include past user activity data. Alternatively, the mobile device 102A can send past user activity data to the recommendation module 320 and/or external front end system 103. The past user activity data can be associated with one or more past sessions associated with the user, and can include past client information, for example, one or more of: Session ID, User ID, hardware information, software information, and location data. Additionally or alternatively, the past user activity data can include past financial data, for example, one or more of: transaction data, pending transaction data, and product offers. Additionally or alternatively, the past user activity data can include past session data, for example, one or more of: session search history, session duration, session start timestamp, and session browsing history. Additionally or alternatively, the past user activity data can include past product status data. for example, one or more of: "in-cart" products, "not in-cart" products, removed products, purchased products, returned products, exchanged products and abandoned products. In examples, the current and/or past user activity data can be associated with a member ID. The current and/or past user activity data can be associated with a client ID.

The recommendation module 320, can include non-transitory memory 322, and/or one or more processors 324. The recommendation module 320, in some embodiments, can be configured to determine one or more excluded products using category filters. For example, the recommendation module 320 can utilize a category filter to determine similarity of one or more products. The category filter can use data stored in the product database 310. Additionally or alternatively, the recommendation module 320 can be configured to determine one or more excluded products using machine learning. The recommendation module 320 can utilize one or more machine learning algorithms, for example, a Collaborative-Filtering based algorithm to find products which are similar to each other. For example, for users who view "Milk" also view "Cheese", the recommendation module 320 can generate a similarity score between the two products. If the similarity score is above similarity score threshold, then the recommendation module 320 can determine the two products to be similar products. The similarity score can be computed using one or more algorithms, for example, a random forest algorithm. The machine learning algorithms can be trained using sanitized or user-identifiable data collected from a plurality of users. Other machine learning algorithms can include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Further, models may include an ensemble model (e.g., a model having a plurality of models). Additionally, the recommendation module 320 can be configured to read/write into one or more databases and retrieve data required to make one or more determinations. The recommendation module 320 can determine a list of relevant products upon applying the one or more excluded products from the excluded product database 316 on at least the product database 310. The one or more excluded products can exclude one or more products and/or product categories stored in the product database 310 to determine the list of relevant products. Additionally, the recommendation module 320 can rank the list of relevant products to generate a ranked list of relevant products. The recommendation module 320 can rank the relevant products in the list of relevant products using one or more ranking rules to generate the ranked list of relevant products. The ranking rules can be based on one or more of: social media data, user location data, product location data, a list of preferred vendors, current date and time, holidays, a list of abandoned products, a list of promoted products, search history, current campaigns, and high profit margin products. For example, relevant products with a high profit margin can be ranked higher in the ranked list while products with lower profit margins can be ranked lower in the ranked list. In another example, relevant products offered by preferred sellers can be ranked higher in the ranked list. In yet another example, abandoned products can be ranked higher in the ranked list. The recommendation module 320 can determine abandoned products based on a period of time that a product remains in the user's shopping cart without being purchased or deleted by the user. For example, the period of time for abandonment can be 1 day, 3 days, 5 days, 7 days, 10 days, 14 days, 15 days, 30 days, 45 days, and/or 60 days. It can be advantageous to generate personalized advertisements at least based on products abandoned by the user since the user has previously desired the product and/or the product category, but did not satisfy their desire since they forgot purchase it. In still yet another example, relevant products that are located close to the user's location or are in high demand at the user's location, can be ranked higher in the ranked list. The recommendation module 320 can select one or more top-ranked relevant products from the ranked list of relevant products to send to the application 340 and/or mobile device 102A for display on the GUI as a personalized advertisement. Additionally, the recommendation module 320 can send data associated with the selected one or more top-ranked relevant products from the product database 310 and/or the creative database 312 to the application 340 and/or mobile device 102A for display on the GUI.

Figure 4:
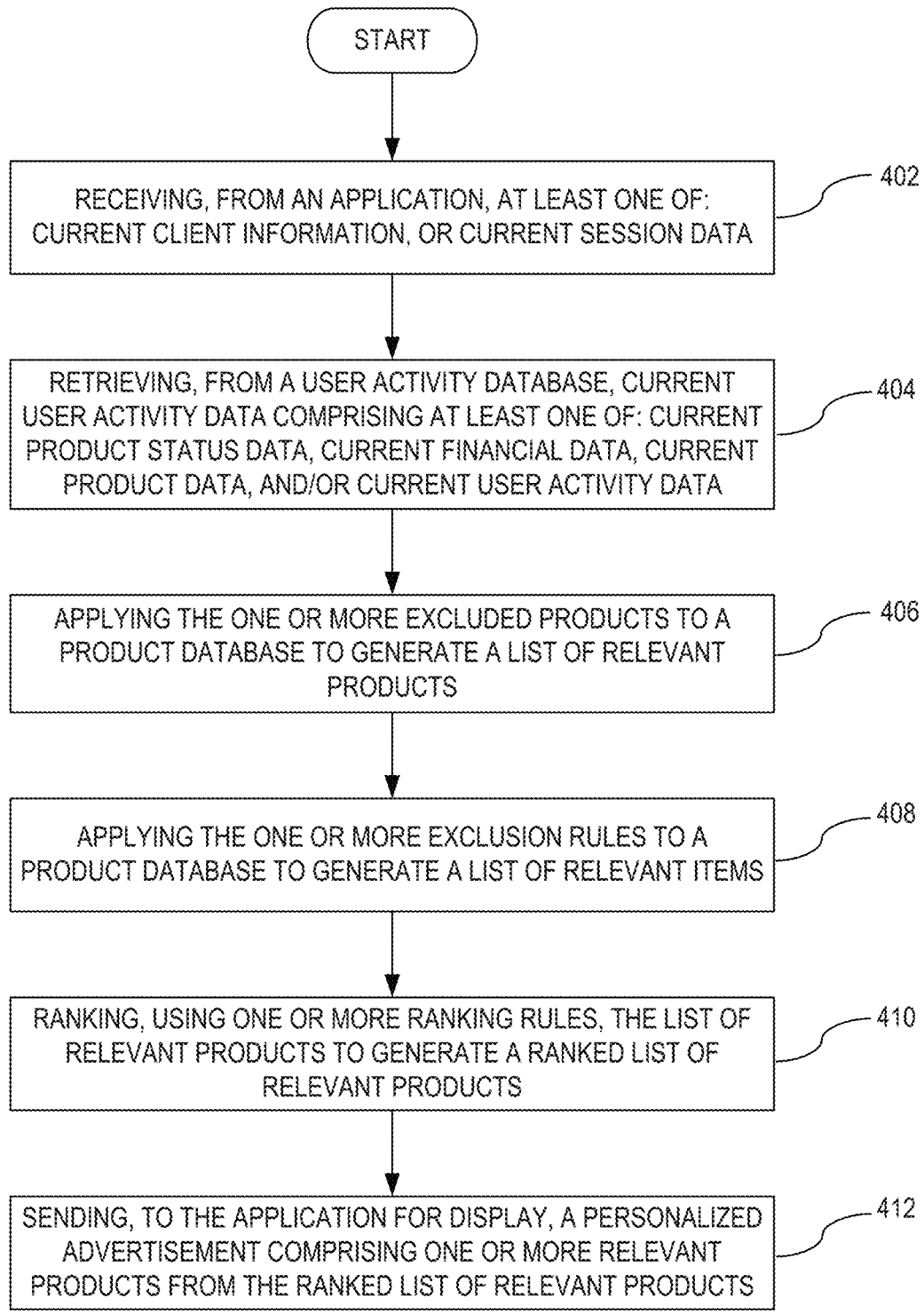
FIG. 4 is a flowchart of an exemplary method for generating and transmitting a personalized advertisement to a user device, consistent with the disclosed embodiments.

FIG. 4 is a flow diagram depicting an exemplary method 400 of generating a personalized advertisement.

At block 402, the method can include receiving, from an application (e.g., application 340), at least one of: current client information, or current session data. Additionally or alternatively, the method 400 can include receiving, from the mobile device (e.g., mobile device 102A), at least one of: past session data or past client information. For example, the external front end system (e.g., external front end system 103) or the recommendation module (e.g., recommendation module 320) can receive, over a network (e.g., network 330) a client ID, a member ID, and/or login credentials. Additionally or alternatively, the recommendation module and/or external front end system can receive attempted login credentials and can be configured to compare the attempted credentials to stored credentials to determine a match between the attempted and stored credentials. Responsive to determining the match, the user can be determined to be a member associated with a member ID. Upon determining that there is no match, the user can be determined to be a non-member and can be associated with the current client ID and/or other current client information and/or current session data.

At block 404, the method 400 can include retrieving, from a user activity database (e.g., user activity database 318), current user activity data comprising at least one of: current product status data, current financial data, current product data, and/or current user activity data. Additionally or alternatively, the method 400 can include retrieving, from the user activity database, at least one of: past product status data, past financial data, past product data, and/or past user activity data. Additionally or alternatively, the past product status data, past financial data, past product data, past user activity data, current product status data, current financial data, current product data, and/or current user activity data can be associated with one or more of: the current client information, the past client information, the current session data, and/or past session data. For example, the recommendation module and/or external front end system can retrieve current user activity data from the user activity database based on the received Client ID. Additionally or alternatively, the recommendation module and/or external front end system can retrieve past user activity data from the user activity database based on the received member ID. Additionally or alternatively, the recommendation module and/or external front end system can retrieve current user activity data from the user activity database based on the received member ID. As discussed with reference to FIG. 3, various data can be stored, retrieved, or modified on the user activity database.

At block 406, the methods 400 can include applying machine learning on the current user activity data to generate one or more excluded products. Additionally or alternatively, method 400 can include applying machine learning on past user activity data to generate one or more excluded products. The one or more excluded products can include one or more of: a list of blacklisted products, a list of similar products, a list of purchased products, or a list of short-cycle products. Additionally, the one or more excluded products can be based on products that are in the user's cart or products that are part of an active pending transaction.

Additionally or alternatively, the one or more excluded products can be based on products that are in the user's cart for less than a period of time. For example, products added to the user's cart within the last 24 hours. The method 400 can generate the one or more excluded products (e.g., a list of blacklisted products). It will be understood that one or more machine learning algorithms and/or category filters can be used to generate the one or more excluded products. Additionally or alternatively, the machine learning model can be trained using a subset of data stored in the one or more databases. As discussed previously with reference to FIG. 3, generating one or more excluded products can be accomplished in a variety ways.

At block 408, the method 400 can include applying the one or more excluded products to a product database (e.g., product database 310) to generate a list of relevant products. In examples, the one or more excluded products can be based on one or more of: a list of blacklisted products, a list of similar products, a list of purchased products, and a list of short-cycle products. Additionally or alternatively, the method 400 can include generating the list of short-cycle products by aggregating a list of purchased products and transaction data for a plurality of users, applying machine learning on the transaction data to determine a repurchase frequency for each purchased product in the list of purchased products, determining that the repurchase frequency for a set of one or more products is less than a repurchase frequency threshold, and generating the list of short-cycle products based on the set of one or more products. Additionally or alternatively, the method 400 can include generating the list of similar products by determining a product category of a purchased product, determining a match between the product category of the purchased product and a product category of one or more products in the product database, and generating the list of similar products based on the match and the one or more products in the product database. It will be understood that one or more machine learning algorithms and/or category filters can be used to generate the list of relevant products. Additionally or alternatively, the machine learning model can be trained using a subset of data stored in the one or more databases. As discussed previously with reference to FIG. 3, generating a list of relevant products can be accomplished in a variety ways.

At block 410, the method 400 can include ranking, using one or more ranking rules, the list of relevant products to generate a ranked list of relevant products. Additionally or alternatively, the one or more ranking rules can be based on one or more properties, for example, at least one of: user location data, product location data, a list of preferred vendors, current date and time, estimated delivery date, estimated delivery time, holidays, social media data, a list of abandoned products, a list of promoted products, search history, current campaigns, and high profit margin products. The recommendation module can associate a weight to each of the properties. Each product in the list of relevant products can be associated with the one or more properties. The recommendation module can rank each product based on a determined weight associated with each of the one or more properties, which are, in turn, associated with each relevant product. The weights can be multiplied and summed by the recommendation module to determine a score for each relevant product. The recommendation module can rank the relevant products in order of the highest score to the lowest score to generate the ranked list of relevant products. In examples, recommendation module can score a green shirt for sale by a preferred vendor higher (e.g., near the top of the ranked list of relevant products) when the user is located in Boston, and the date is a few days before St. Patrick's Day. On the other hand, a Julius Caesar cosplay outfit can score lower (e.g., near the bottom of the ranked list of relevant products) when the outfit is not sold by a preferred vendor, and is not determined to be a high-profit margin item, even though the date is a few days before the Ides of March, and the product location is near a user location. In yet another example, products that are estimated to be delivered after a certain date or time, can be ranked lower. For example, a turkey for sale is estimated to be delivered before Thanksgiving Day, another turkey for sale is estimated to be delivered at 6:00 pm (e.g., dinner time) on Thanksgiving Day, and a third turkey for sale is estimated to be delivered a few days after Thanksgiving Day, the recommendation module can determine that a turkey delivered before the Thanksgiving Feast (e.g., 6:00 pm on Thanksgiving Day) is more relevant to the user and can score the first turkey higher than the second or third turkeys. In another example, products that are estimated to be delivered before a certain date or time, can be ranked lower. For example, a tuna sushi roll for sale is estimated to be delivered a few weeks before a local Tuna Enthusiast's convention, and another tuna sushi roll for sale is estimated to be delivered at 8:00 am on the day of the Tuna Enthusiast's convention, the recommendation module can determine that a sushi roll delivered weeks ahead of the convention is less relevant to the user and can therefore score the second tuna sushi roll higher than the first sushi roll. In an example, the user can input the date and time of the Tuna Enthusiast's convention, or another desired date and/or time. In examples, the sushi rolls can be sold by the same vendor or by different vendors. In examples, the recommendation module can select between different delivery options, thereby optimizing for delivery time, delivery costs, total costs, or environmental impact. In another example, products that are estimated to be delivered on a certain date or time, can be ranked lower. For example, very large and highly desirable television for sale is estimated to be delivered a few weeks before a family daytrip, and another very large and highly desirable television for sale is estimated to be delivered on the day of the planned family daytrip, the recommendation module can determine that a TV delivered when nobody is at home is less relevant to the user and can score the first very large and highly desirable television higher than the second very large and highly desirable television. The certain date and time can be automatically determined by the recommendation module or can be determined by the user and received as an input by the recommendation module. As discussed previously with reference to FIG. 3, ranking the list of relevant products can be accomplished in a variety of ways.

At block 412, the method 400 can include sending, to the application for display on the GUI, the personalized advertisement comprising one or more top relevant products from the ranked list of relevant products. Additionally, the personalized advertisement can include media and/or product data associated with the one or more top-ranked relevant products. In an example, the recommendation module and/or the external front end system can send the personalized advertisement upon determination of the one or more top-ranked products. Additionally, the method 400 can include receiving, from the application, a selection of a first relevant product from the personalized advertisement; and sending, for display to the application, a product page comprising information (e.g., product data) associated with the first relevant product. As discussed below in reference to FIG. 5, the personalized advertisement can be displayed in a variety of ways.

Figure 5:
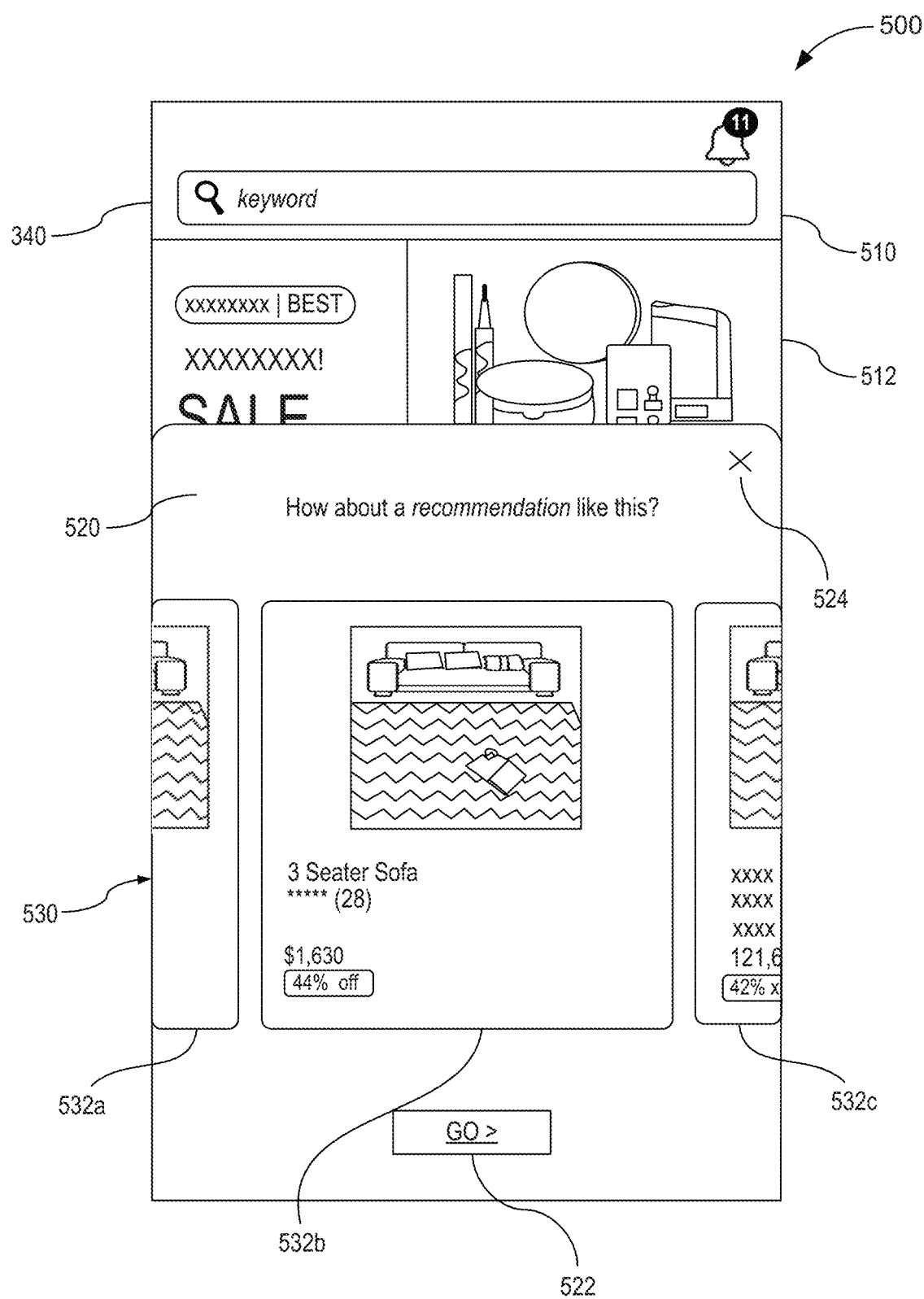
FIG. 5 is a sample graphical user interface on a user device that includes an example personalized advertisement, consistent with the disclosed embodiments.

FIG. 5 is a sample graphical user interface 500 on the mobile device 102A that includes an example personalized advertisement. The graphical user interface 500 (GUI) can be associated with the application 340 and can be configured to display one or more of: windows, web elements, UI elements, or audio/visual media. Additionally, the GUI 500 can be configured to receive user input, for example, a finger swipe, or a mouse click. The GUI 500 can include a window 510 configured to display a page 512. An overlay 520 can be integral to the window 510 and can display at least partially over the page 512. Alternatively, the overlay 520 can be a second window and can display at least partially over the page 512. The overlay 520 can include a first user input 522, a second user input 524, a relevant product display region 530, and one or more top-ranked relevant products 532a, 532b, 532c. The overlay 520 and/or the one or more ranked relevant products 532a, 532b, 532c can be displayed and/or be received by the application 340 upon the application 340 being in a launched state. Additionally or alternatively, the overlay 520 and/or the one or more ranked relevant products 532a, 532b, 532c, can be received by the application 340 in an unlaunched state, and can be displayed upon the application 340 being in a launched state. Additionally or alternatively, the overlay 520 and/or the one or more ranked relevant products 532a, 532b, 532c can be displayed and/or be received by the application 340 upon the user successfully logging into the application 340. Additionally or alternatively, the overlay 520 and/or the one or more ranked relevant products 532a, 532b, 532c can be displayed and/or be received upon the user submitting a search query. Additionally or alternatively, the overlay 520 and/or the one or more ranked relevant products 532a, 532b, 532c can be displayed and/or be received upon the user navigating into a single detail page. Additionally or alternatively, the overlay 520 and/or the one or more ranked relevant products 532a, 532b, 532c can be displayed and/or be received upon the user navigating away from a single detail page.

The relevant product display region 530 can include a carousel of cards, each card can include media associated with a top-ranked relevant product of the one or more top-ranked relevant products. Additionally, each card can include data associated with the top-ranked relevant product from the product database 310. In an example, the user can scroll the carousel can reveal a second top-ranked relevant product of the one or more top-ranked relevant products. Alternatively, the carousel can scroll automatically at a predetermined speed (e.g., pixels per second or millimeters per second).

Upon receiving a selection of the first user input 522, the overlay 520 can disappear and the window 510 can direct to and display a second page associated with the selected top-ranked relevant product (e.g., a Single Detail Page as depicted in FIG. 1C). The first user input 522 can be dynamically updated to direct to and display a third page associated with the second top-ranked relevant product, upon the second top-ranked relevant product being selected.

Upon receiving a selection of the second user input 524, the overlay 520 can disappear and page 512 can be interactable by the user. Additionally or alternatively, the overlay 520 can disappear in response to the user selecting or interacting with page 512.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for generating, for display on a graphical user interface (GUI) of an application, a personalized advertisement, the method comprising:
  receiving, from an application, at least one of:
    current client information, or
    current session data;
  retrieving, from a user activity database, current user activity data comprising at least one of:
    current product status data,
    current financial data, or
    current product data;
  training a random forest machine learning algorithm using data collected from a plurality of users and stored in a product database;
  applying the trained random forest machine learning algorithm to the current user activity data to compute respective similarity scores between a plurality of products;
  generating a list of one or more excluded products based on the similarity scores, the generating comprising:
    determining a product category of a browsed and not purchased product from a session;
    generating a list of similar products to exclude from display by i) determining one or more other products in a product database that have a corresponding product category that matches the product category of the browsed and not purchased product and ii) identifying one or more of the determined other products having a computed similarity score with the browsed and not purchased product that is above a similarity score threshold, wherein the list of similar products includes the identified one or more other products and the list of one or more excluded products includes the list of similar products;

applying the list of one or more excluded products to a product database to generate a list of relevant products, the list of relevant products not including the one or more excluded products;

ranking, using one or more ranking rules, the list of relevant products to generate a ranked list of relevant products, wherein the one or more ranking rules are based on at least one ranking rules property, including:
   a list of preferred vendors,
   a list of holidays,
   a list of abandoned products left in a virtual cart without being purchased, or
   current campaigns,
      wherein each ranking rule property is associated with a weight, and the ranking step is performed based at least in part on a weight corresponding to the one or more ranking rules used;

determining one or more relevant products from the ranked list of relevant products; and sending, to the application for display, a personalized advertisement comprising the determined one or more relevant products from the ranked list of relevant products.

2. The method of claim 1, wherein: the current user activity data additionally comprises one or more of:
   client information comprising one or more of: Session ID, User ID, hardware information, software information, and location data;
   financial data comprising one or more of: product offers, transaction data, and pending transaction data; or
   session data comprising one or more of: session search history, session duration, session start timestamp, and session browsing history.

3. The method of claim 1, wherein the list of one or more excluded products further includes one or more of: a list of blacklisted products, a list of purchased products, or a list of short-cycle products.

4. The method of claim 3, wherein the list of short-cycle products is generated by:
   aggregating a list of purchased products and current user activity data for a plurality of users;
   applying the trained random forest machine learning algorithm on the current user activity data for the plurality of users to determine a repurchase frequency for each purchased product in the list of purchased products;
   determining that the repurchase frequency for a set of one or more products is less than a repurchase frequency threshold; and
   generating the list of short-cycle products based on the set of one or more products.

5. The method of claim 4, wherein repurchase frequency is a time period between a user's purchase of a product and a subsequent purchase of the same product.

6. The method of claim 1, further comprising:
   receiving, from the application, a selection of a first relevant product from the personalized advertisement; and
   sending, for display to the application, a product page comprising product data associated with the first relevant product.

7. A system for generating, for display on a graphical user interface (GUI) of an application, a personalized advertisement, the system comprising:
   one or more processors; and
   computer readable memory media comprising instructions which, when executed by the one or more processors, cause the one or more processor to:
      receive, from an application, client information;
      retrieve, from a user activity database, past user activity data;
      train a random forest machine learning algorithm using data collected from a plurality of users and stored in a product database;
      apply the trained random forest machine learning algorithm to the past user activity data to compute respective similarity scores between a plurality of products;
      generate a list of one or more excluded products based on the similarity scores, the generation comprising:
         determining a product category of a searched and not purchased product from a session;
         generating a list of similar products to exclude from display by i) determining one or more other products in a product database that have a corresponding product category that matches the product category of the searched and not purchased product and ii) identifying one or more of the determined other products having a computed similarity score with the browsed and not purchased product that is above a similarity score threshold, wherein the list of similar products includes the identified one or more other products and the list of one or more excluded products includes the list of similar products;
      apply the list of one or more excluded products to a product database to generate a list of relevant products, the list of relevant products not including the one or more excluded products;
      rank, using one or more ranking rules, the list of relevant products to generate a ranked list of relevant products, wherein the one or more ranking rules are based on at least one ranking rules property including:
         a list of preferred vendors,
         a list of holidays,
         a list of abandoned products left in a virtual cart without being purchased, wherein the abandoned products were left without being purchased, or
         current campaigns,
            wherein each ranking rule property is associated with a weight, and the ranking is performed based at least in part on a weight corresponding to the one or more ranking rules used;
      determine one or more relevant products from the ranked list of relevant products; and
      send, to the application for display on the GUI, the personalized advertisement comprising the determined one or more relevant products from the ranked list of relevant products.

8. The system of claim 7, wherein: the past user activity data additionally comprises one or more of:

past client information comprising one or more of: Session ID, User ID, hardware information, software information, and location data;
past financial data comprising one or more of: transaction data, pending transaction data, and product offers;
past session data comprising one or more of: session search history, session duration, session start timestamp, and session browsing history; or
past product status data comprising one or more of: "in-cart" products, "not in-cart" products, removed products, purchased products, returned products, exchanged products and abandoned products.

9. The system of claim 7, wherein the list of one or more excluded products further includes one or more of: a list is blacklisted products, a list of purchased products, and a list of short-cycle products.

10. The system of claim 9, wherein the list of short-cycle products is determined by the instructions causing the one or more processors to:
aggregate a list of purchased products and past user activity data for a plurality of users;
apply the trained random forest machine learning algorithm on the past user activity data for the plurality of users to determine a repurchase frequency for each purchased product in the list of purchased products;
determine that the repurchase frequency for a set of one or more products is less than a repurchase frequency threshold; and
generate the list of short-cycle products based on the set of one or more products.

11. The system of claim 10, wherein repurchase frequency is a time period between a user's purchase of a product and a subsequent purchase of the same product.

12. The system of claim 7, wherein the instructions further cause the one or more processors to:
receive, from the application, a selection of a first relevant product from the personalized advertisement; and
send, for display to the application, a product page comprising product data associated with the first relevant product.

13. A method for generating, for display on a graphical user interface (GUI) of an application, a personalized advertisement, the method comprising:
receiving, from an application, at least one of:
current client information, or
current session data;
retrieving, from a user activity database, current user activity data comprising at least one of:
current product status data,
current financial data, or
current product data;
training a random forest machine learning algorithm using data collected from a plurality of users and stored in a product database;
applying the trained random forest machine learning algorithm to the current user activity data to compute respective similarity scores between a plurality of products;
generating a list of one or more excluded products based on the similarity scores, the generating comprising:
determining a product category of a viewed and not purchased product from a session;
generating a list of similar products to exclude from display by i) determining one or more other products in a product database that have a corresponding product category that matches the product category of the viewed and not purchased product and ii) identifying one or more of the determined other products having a computed similarity score with the viewed and not purchased product that is above a similarity score threshold, wherein the list of similar products includes the identified one or more other products and the list of one or more excluded products includes the list of similar products;
aggregating a list of purchased products and current user activity data for a plurality of users;
applying the trained random forest machine learning algorithm on the current user activity data for the plurality of users to determine a repurchase frequency for each purchased product in the list of purchased products;
determining that the repurchase frequency for a set of one or more products is less than a repurchase frequency threshold; and
generating a list of short-cycle products based on the set of one or more products;
applying the list of one or more excluded products to the product database to generate a list of relevant products, the list of relevant products not including the one or more excluded products;
ranking, using one or more ranking rules, the list of relevant products to generate a ranked list of relevant products, wherein the one or more ranking rules are based on at least one ranking rules property, including:
a list of preferred vendors,
a list of holidays,
a list of abandoned products left in a virtual cart without being purchased, or
current campaigns,
wherein each ranking rule property is associated with a weight, and the ranking step is performed based at least in part on a weight corresponding to the one or more ranking rules used;
determining one or more relevant products from the ranked list of relevant products; and
sending, to the application for display on a GUI, a personalized advertisement comprising the determined one or more relevant products from the ranked list of relevant products.

14. The method of claim 13, further comprising:
receiving, from the application, a selection of a first relevant product from the personalized advertisement; and
sending, for display to the application, a product page comprising product data associated with the first relevant product.

* * * * *